United States Patent
Drew et al.

(10) Patent No.: US 9,530,255 B2
(45) Date of Patent: Dec. 27, 2016

(54) SYSTEM AND METHOD FOR COMMUNICATING WITH AN ELECTRONIC CONTROL UNIT OF A VEHICLE TO DETERMINE IF THE VEHICLE IS SAFE

(71) Applicant: Drew Technologies, Inc., Ann Arbor, MI (US)

(72) Inventors: Michael Drew, Dexter, MI (US); Brian Herron, Dexter, MI (US); Ghassan Nassar, Canton, MI (US); Thomas Fournier, Tucson, AZ (US)

(73) Assignee: DREW TECHNOLOGIES, INC., Ann Arbor, MI (US)

( * ) Notice: Subject to any disclaimer, the term of this patent is extended or adjusted under 35 U.S.C. 154(b) by 0 days.

(21) Appl. No.: 14/713,461

(22) Filed: May 15, 2015

(65) Prior Publication Data

US 2016/0335812 A1    Nov. 17, 2016

(51) Int. Cl.
*G07C 5/00* (2006.01)
*G07C 5/08* (2006.01)
*B60R 16/023* (2006.01)

(52) U.S. Cl.
CPC ............. *G07C 5/008* (2013.01); *B60R 16/023* (2013.01); *G07C 5/0808* (2013.01); *G07C 5/0825* (2013.01)

(58) Field of Classification Search
CPC ..... G07C 5/008; G07C 5/0825; G07C 5/0808; B60R 16/023
USPC ......................................................... 701/31.4
See application file for complete search history.

(56) References Cited

U.S. PATENT DOCUMENTS

| | | | |
|---|---|---|---|
| 8,589,018 B2 * | 11/2013 | Sarnacke | B60R 25/00 701/29.2 |
| 9,280,859 B2 * | 3/2016 | Itatsu | G07C 5/0808 |
| 2009/0055045 A1 * | 2/2009 | Biswas | G07C 5/0808 701/31.4 |
| 2011/0224866 A1 * | 9/2011 | Chen | G07C 5/0808 701/31.4 |
| 2013/0158777 A1 * | 6/2013 | Brauer | G06Q 10/20 701/31.4 |
| 2013/0282229 A1 * | 10/2013 | Wittliff, III | G07C 5/0808 701/33.2 |

* cited by examiner

*Primary Examiner* — Brian P Sweeney
(74) *Attorney, Agent, or Firm* — Brinks, Gilson & Lione

(57) ABSTRACT

A system and method for sending and receiving messages from an electronic control unit of a vehicle to determine if the vehicle is safe includes a processor, a display and a port. The port and display are in communication with the processor. The port is configured to communicate with the electronic control unit of the vehicle. The processor is configured to receive information from the electronic control unit of the vehicle. The information includes processing of at least one trouble code or other data from at least one subsystem of the vehicle. The processor is further configured to determine and display on the display device a safety state of the vehicle based on the received trouble codes or data from the subsystem of the vehicle.

20 Claims, 4 Drawing Sheets

SYSTEM AND METHOD FOR COMMUNICATING WITH AN ELECTRONIC CONTROL UNIT OF A VEHICLE TO DETERMINE IF THE VEHICLE IS SAFE

BACKGROUND

1. Field of the Invention

The present invention generally relates to systems and methods for communicating with an electronic control unit of a vehicle.

2. Description of Related Art

Numerous government agencies perform periodic testing for the emissions outputted by vehicles. These emission testing devices may be stand-alone devices that only perform emissions testing or may be general purpose computers that are loaded with the appropriate software and hardware to perform emissions testing. Testing for emissions is generally performed by connecting the emissions testing device to a port that is in communication with the electrical systems of the vehicle. This communication port is normally located between the dashboard and the brake pedal of the vehicle.

The port is most likely to be a Society of Automotive Engineers ("SAE"), J1962 Port better known as an On-Board Diagnostics II ("OBD-II") port. This port allows communication between external devices and the electronic systems in communication with a bus of the vehicle. The bus may be connected to numerous electronic control units located within the vehicle as well as sensor systems that are also located within the vehicle.

The sensor systems routinely collect data relating to the operation of the vehicle, including safety and emissions related data. The emissions testing device connected to the port will communicate with the electronic control unit of the vehicle regarding emissions related information of the vehicle. The emissions testing device will analyze this data and make a determination if the vehicle has met the agency standard for emissions related operation.

SUMMARY

A system and method for sending and receiving messages from an electronic control unit of a vehicle to determine if the vehicle is safe includes a processor, a display and a port. The port and display are in communication with the processor. The port is configured to communicate with the electronic control unit of the vehicle. The processor is configured to receive information from the electronic control unit of the vehicle. The information includes at least one trouble code from at least one subsystem of the vehicle. The processor is further configured to determine and display on the display device a safety state of the vehicle based on the received trouble codes from the subsystem of the vehicle.

Further objects, features and advantages of this invention will become readily apparent to persons skilled in the art after a review of the following description, with reference to the drawings and claims that are appended to and form a part of this specification.

DETAILED DESCRIPTION

Figure 1:
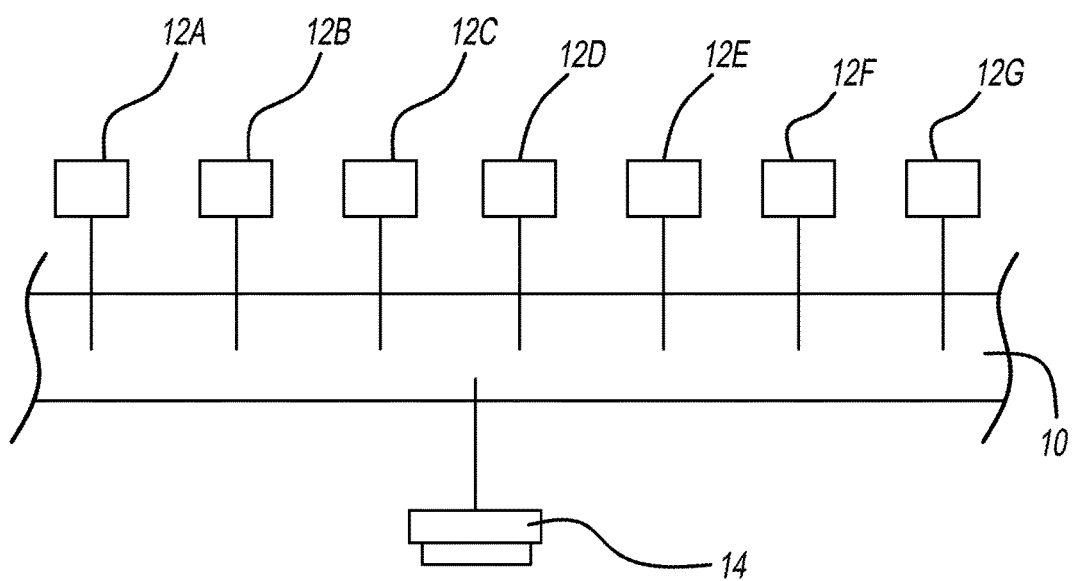
FIG. 1 illustrates a bus for a vehicle having various electrical systems of the vehicle connected to the bus as well as a port.

Referring to FIG. 1, a prior art bus 10 commonly found within a vehicle is shown. The bus 10 essentially acts as a conduit for communication between various electrical systems of a vehicle. The bus may be any one of a number of different types of buses, but it is generally a Controller Area Network ("CAN") type bus.

The bus 10 may have any one of the number of different electrical systems in electrical communication with the bus 10. For example, the bus 10 may be in communication with an electronic control unit 12A relating to the emissions of the vehicle. The bus may also be in communication with other electrical systems having electronic control units, such as an engine control system electronic control unit 12B, a body control module electronic control unit 12C, an anti-lock braking system electronic control unit 12D, a power steering electronic control unit 12E, a tire pressure monitoring system electronic control unit 12F, and/or a vehicle safety system control system electronic control unit 12G. Of course, the systems described are merely examples, and additional systems may be connected to the bus 10 of the vehicle.

Figure 2:
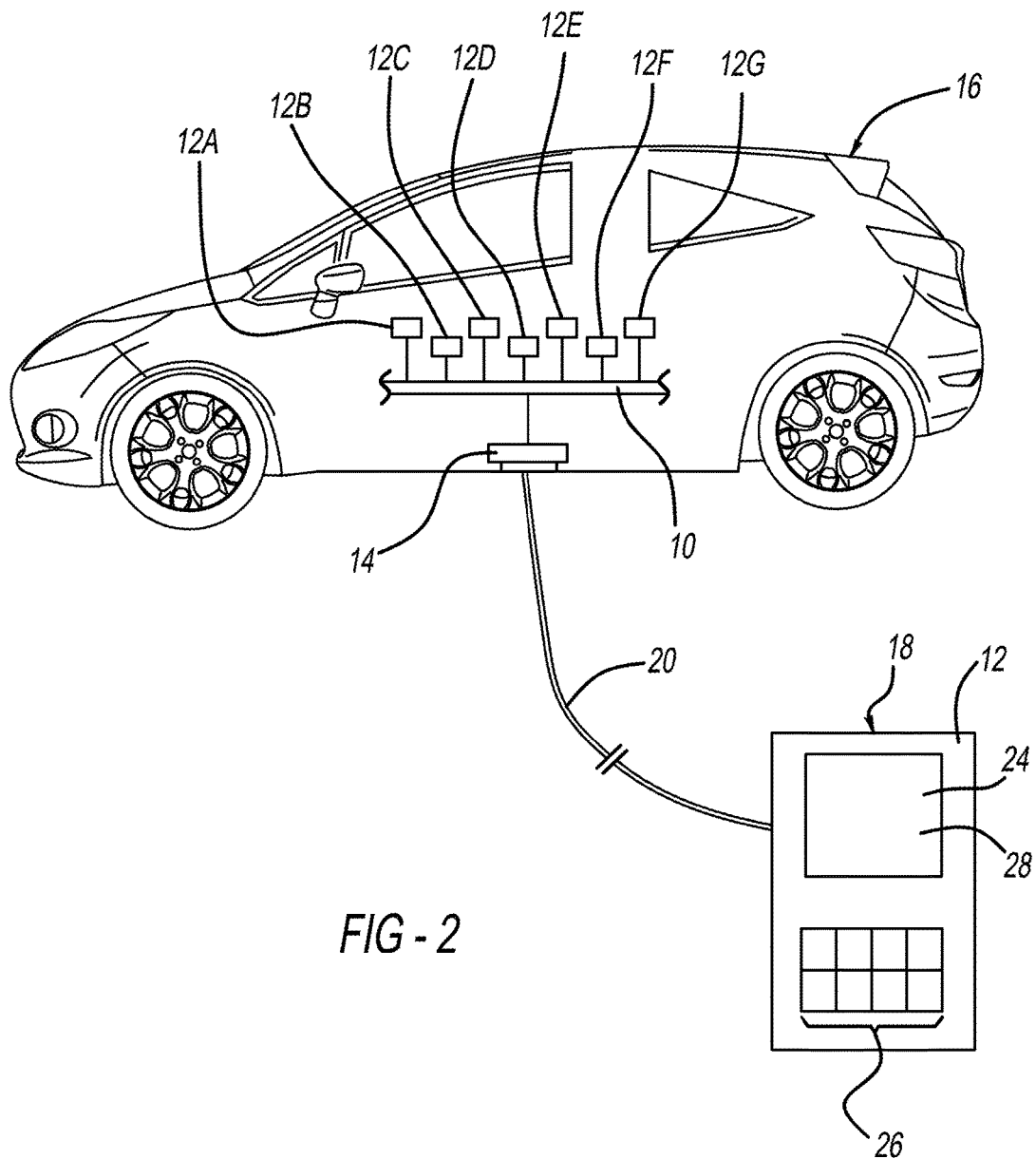
FIG. 2 illustrates a system for communicating with an electronic control unit of a vehicle to determine if the vehicle is safe.

Also in communication with the bus 10, is a port 14. The port 14 may be any one of a number of different ports allowing external devices to connect to the bus 10. The port 14 may be an SAE J1962 type port, commonly called OBD-II type port. Of course, it should be understood that any one of a number of different ports could be utilized, such as a USB or other serial or parallel ports. In addition, it should be understood that the port 14 may be a network access device allowing the port 14 to connect to external devices via a number of different networking protocols. Further, the port 14 could also be a wireless network access device allowing devices to wirelessly connect to the bus 10 via the network access device 18 (FIG. 2). Wireless protocols used to connect could include Bluetooth or Wi-Fi type wireless connection protocols.

Referring to FIG. 2, a vehicle 16 is shown. The vehicle 16 incorporates a bus 10 as well as the vehicle electrical systems 12A-12G. As explained previously, the vehicle electrical systems may be any one of a number of different vehicle electrical systems and it should be understood that the vehicle electrical systems should not be limited to just those described in this specification. Also shown is the port 14 that is in communication with the bus 10 of the vehicle 16.

The vehicle 16 may be any one of a number of different vehicles. For example, the vehicle 16 may be a traditional automobile, like truck, or sport utility vehicle. In addition, it should be understood that the vehicle may be a heavy duty truck, tractor trailer, bus, motorcycle, ATV (All Terrain Vehicle) or farm tractor. In addition, the vehicle 16 should not just be limited to field vehicles but could also include airplanes and watercrafts. In any case, the vehicle 16 could be any vehicle that is capable of transporting individuals or objects from one point to another.

Here, the port 14 of the vehicle 16 is connected to a device 18 or system for communication with an electronic control unit(s), such as electronic control units 12A-12G, of the vehicle 16 to determine if the vehicle is safe. As shown here, the device 18 may be a dedicated device that is solely directed to testing and determining if the vehicle 16 is safe or may be a general purpose computer, as will be explained later in this description that has been loaded with the appropriate software and provided the appropriate hardware to perform testing.

Here, the device 18 is connected to the port 14 via a cable 20. Of course, as stated earlier, the device 18 could also be connected to the port 14 via a variety of different networking protocols, including wireless protocols. When connected thusly, the device 18 can access a variety of different electronic control units 12A-12G connected to the bus 10 of the vehicle 16. In this case, the device 18 is capable of communicating and reading data from any of the electronic control units 12A-12G. Each of the electronic control units 12A-12G may be connected to different sensors located within the vehicle 16. The sensors collect information regarding each of the electrical systems and provides this data to each electronic control units 12A-12G. The electronic control units 12A-12G can then record this data in the form of a trouble code or fault code that is stored by the electronic control units 12A-12G. These trouble codes or fault codes stored by the different electronic control units 12A-12G can then be provided to the device 18 via the cable 20, while the device 18 is connected to the vehicle 16 via the port 14.

As stated before, the device 18 may be a dedicated device. In a situation where the device 18 is a dedicated device, the device 18 may have a housing 12 for encasing a display 24 for displaying information to the operator of the device 18. The device 18 may also include an input device 26 for inputting information into the device 18. The display device 24 may be a display panel capable of displaying text and/or graphics. However, it should be understood that the display device 24 may also be a series of lights or other visual indicia indicating the operational status of the device 18. The input device 26 may be any one of a number of physical input devices, such as buttons, knobs, switches, or voice command circuitry. In addition, the input device 26 may be a touch panel 28 that overlays the display panel 24 of the device 18. In this way, the touch panel 28 can be utilized by the operator of the device 18 to input information into the device 18 or review information generated by the device 18.

Figure 3:
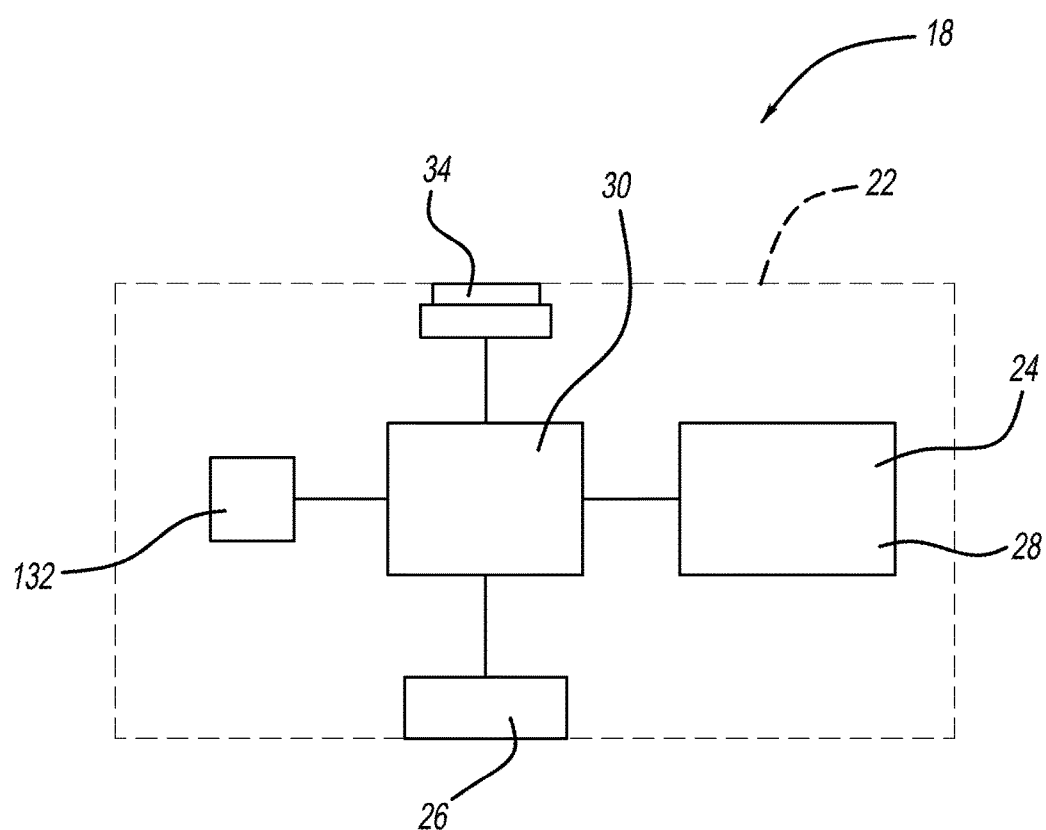
FIG. 3 illustrates one example of the system for communicating with the electronic control unit of the vehicle to determine if the vehicle is safe.

Referring to FIG. 3, a more detailed view of the device 18 is shown. Here, the device 18 includes a processor 30 in communication with a memory 132. The memory 132 may contain instructions for conveying the processor to perform any one of a number of different methods described in the specification. Of course, it should be understood that the processor 30 may be a single processor or may be several processors working in concert. Additionally, the memory 132 may be integrated within the processor or may be separate from the processor 30. The memory 132 may be a solid state device, magnetic device, optical device, or any device capable of storing electronic information.

The processor 30 is also in communication with a port 34. The port 34 is configured to communicate with the port 14 of the vehicle 16 via the cable 20 as best shown in FIG. 2. The port 34 allows either one-way or two-way communication with the vehicle 16.

As previously stated, the device 18 may also include a display device 24 and an input device 26. Both the display device 24 and the input device 26 are also in communication with the processor 30 of the device 18. In the case where the input device 26 is a touchscreen 28, the touchscreen 28 is in communication with the processor 30 as well.

Figure 4:
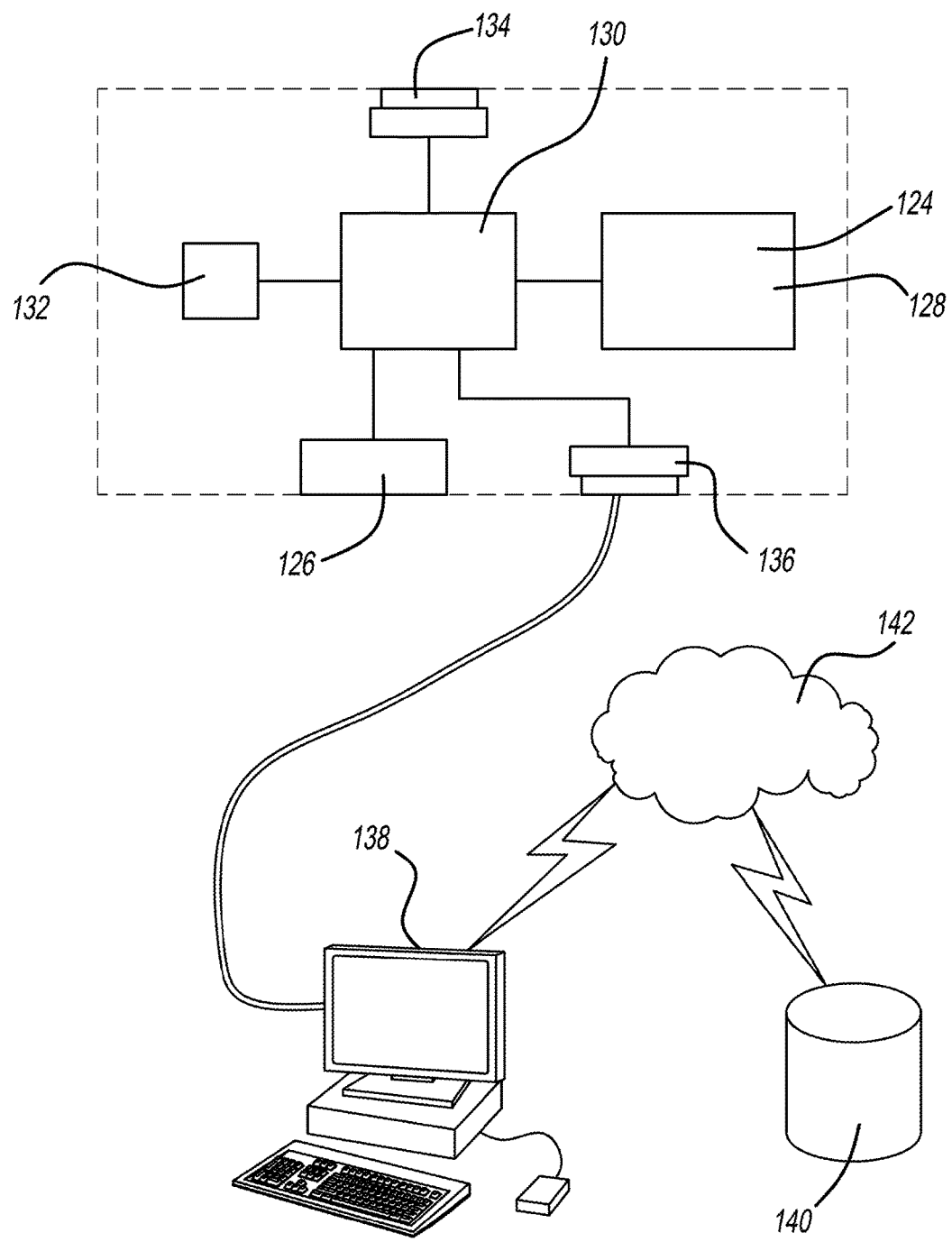
FIG. 4 illustrates another embodiment of the system for communicating with the electronic control unit of a vehicle to determine if the vehicle is safe.

Referring to FIG. 4, another embodiment of the device 18 is shown, here as device 118. It should be noted that like reference numerals have been utilized to refer to like elements, and that any previous description is equally applicable to these elements. In this example, the device 118 also contains a second port 136 capable of allowing communication with an external device 138, such as a personal computer or a mobile device, such as a mobile phone or tablet device. Of course, it should be understood that the port 136 may be a network access device allowing a wireless connection with the external device 138. Wireless protocols that could be utilized to allow wireless communication could include but are not limited to Wi-Fi or Bluetooth.

The external device 138 may be connected to a remote database 140 via a distributed network 142, such as the Internet. The processor 130 of the device 118 may be configured such that any instructions or data contained within the memory 132 can be updated by interacting with the external device 138. New instructions or data can be provided to the external device 138 from a remote database 140 via a distributed network 142. These new instructions could include additional or updated methodologies or could include data such as additional vehicle data or trouble code data, as will be described later in this application.

Referring back to FIG. 2, as stated previously, the device 18 may be placed in communication with the electronic control units 12A-12G via the port 14 through a cable 20. When thusly connected, the processor 30 of the device 18 is configured to receive information from the electronic control units 12A-12G of the vehicle 16. The information from the electronic control units 12A-12G includes at least one trouble code from at least one of the subsystems of the vehicle. The processor 30 is configured to determine and display on the display device 24 a safety state of a vehicle based on the received trouble codes from the subsystem of the vehicle 16. For example, the trouble codes could be related to safety related information, and any trouble codes related to safety related information could be provided to the operator device or could be provided in the form of a safety state, indicating that the vehicle 16 is safe or not. The processor 30 could be further configured to display device 24 a checklist of potential hazardous items for additional inspection based on the received information.

The processor 30 could be configured to receive information from a variety of different items relating to the operation of the vehicle 16. These items could include data items related to the physical operation of the vehicle 16. For example, these data items regarding the physical operation could include the fluid level of at least one brake or the thickness of at least one brake pad. If either of the fluid level of the brake system or the thickness of the brake pad is low, the processor 30 could be configured to update the safety state and provide additional information to the operator of the device 18 via the display device 24.

The processor 30 could also be configured to place one or more electronic control units 12A-12G of the vehicle 16 in a test mode. In a test mode, the processor 30 receives data relating to at least one subsystem of the vehicle from electronic controlling of the vehicle when at least one subsystem of the vehicle 16 is actuated by an operator during a test mode. For example, at least one subsystem could be the steering subsystem or the brake subsystem. Here, the operator, when in test mode, could operate the steering subsystem by actuating the steering wheel or the brake system by actuating the brake pedal. If the appropriate information is not received by the processor 30, the processor 30 could update the safety state to indicate that the vehicle 16 is or is not safe.

The processor 30 could also be configured to determine if the bus 10 of the vehicle 16 is operating properly based on the electrical resistance or other electrical properties of the data bus 10 of the vehicle. If the electrical resistance or other expected properties are not proper, the processor 30 could indicate that the network of the vehicle 16 is not functioning properly and that the vehicle 16 is no longer safe to operate.

The processor 30 could also be configured to determine if any outstanding recalls of the vehicle 16 have not been performed based on the trouble codes from the at least one subsystem of the vehicle. For example, the memory 132 of the device 18 could contain a database of recalls and a determination could be made if these recalls have been performed on the vehicle 16 based on the received trouble codes. Alternately, the processor 30 of the device 18 could be configured to query a database of recalls located on database 140 via external device 138 and distributed network 142. In either case, if the recalls have not been performed, the vehicle 16 could be determined unsafe to drive.

One vehicle electronic control unit which may be providing trouble codes to the processor 30 of the device 18 is a body control module of the vehicle. The trouble codes of the body control module electronic control unit 12C of the vehicle could include trouble codes related to the head lights, tail lights, brake lights, or turn signals of the vehicle. For example, these trouble codes could indicate that one or more of these lights are burnt out or not operating properly. The trouble codes for the body control module 12C could also indicate whether there is a problem with an automatic head lighting system preventing the automatic head light system from turning on in low light conditions. As it is known, automatic head light systems automatically turn on the head lights when natural light is at a low level. However, if there is an issue with the automatic headlight system, the head lights may not be turned on causing an unsafe situation.

Another vehicle's subsystem that may provide trouble codes to processor 30 is the anti-lock braking system electronic control units 12D of the vehicle 16. The trouble codes for the anti-lock braking system could include low brake fluid, inoperative wheel sensor, or brake pad thickness. Another vehicle subsystem that could provide trouble codes to the processor 30 of the device 18 is an engine control system of the vehicle. The trouble codes of the engine control system of the vehicle could include a gas pedal failure or drive-by wire throttle system failure. Another vehicle subsystem that could provide trouble codes to the processor 30 is the power steering subsystem of the vehicle.

Another vehicle subsystem that could provide trouble codes to the processor 30 are vehicle subsystems related to the safety of the vehicle. These vehicle subsystems could include a tire pressure monitoring system of the vehicle, wherein the low tire pressure could indicate that the vehicle is unsafe. However, the safety systems could include numerous additional electronic safety systems such as lane departure warning systems, blind spot detection warning systems, back-up camera or back-up sensing systems, onboard radar systems, cameras, sensors, or automatic rain sensing wiper control modules. Of course, it should be understood that any one of a plurality or plethora of different electronic systems could be providing trouble codes to the processor 30, wherein the processor 30 will make a determination whether the vehicle is safe or not. Another vehicle subsystem that could provide trouble codes to the processor 30 are autonomous driving functions, wherein autonomous driving functions may provide the capability of sensing the vehicle's environment and navigating the vehicle with reduced or even without human input.

In making a determination whether the vehicle 16 is safe or not, the processor 30 could perform any one of a number of different methods for making this determination. One such methodology could include a point system, wherein vehicle trouble codes are each given a point. If over a certain number of points are counted based on a number of trouble codes received by the processor 30, the processor 30 could determine that the vehicle 16 is unsafe to drive. In addition, the processor 30 may be configured to select certain trouble codes such that, if they are ever received by the processor 30, they will indicate that the vehicle 16 is not safe. For example, these trouble codes could be trouble codes related to the power steering or braking system, wherein the trouble codes indicate a catastrophic failure is present or eminent regarding these systems.

The processor 30 could also weight different trouble codes with different amounts of points. For example, some trouble codes may receive fewer points while other trouble codes may receive more points. For example, certain trouble codes indicating a catastrophic eminent failure could be given several points, while other trouble codes relating to other minor issues, such as a burnt out turn signal, could be given fewer points. The summation of the all the points could be performed by the processor 30 and if the summation is above a certain threshold level, the processor 30 may determine that the vehicle 16 is unsafe to drive. Further, comparative readings from disparate on-board data streams could be used by processor 30 to generate fault codes not generated by the vehicle via the vehicle manufacturer's on-board systems. In other words, the processor 30 could be configured with algorithms designed to infer and then report the presence of an unsafe condition from disparate data streams that individually or collectively do not trigger a fault code from the vehicle's on-board systems.

As a person skilled in the art will readily appreciate, the above description is meant as an illustration of implementation of the principles of this invention. This description is not intended to limit the scope or application of this invention in that the invention is susceptible to modification, variation and change, without departing from the spirit of this invention, as defined in the following claims.

The invention claimed is:

1. A system for sending and receiving messages from an electronic control unit of a vehicle to determine if the vehicle is safe, the system comprising:
 a processor;
 a display device in communication with the processor;
 a port in communication with the processor, wherein the port is configured to communicate with the electronic control unit of the vehicle, the electronic control unit of the vehicle being connected to a data bus;
 wherein the processor is configured to receive information from the electronic control unit of the vehicle, the information includes at least one trouble code from at least one subsystem of the vehicle;
 wherein the processor is configured to determine and display on the display device a safety state of the vehicle based on the receipt of at least one trouble code from at least one subsystem of the vehicle or receipt of data from at least one subsystem whereby the processor infers the presence of an unsafe condition with or without the presence of a trouble code; and wherein the processor is configured to assign a point value to the at least one trouble code or the data from at least one subsystem whereby the processor infers the presence of an unsafe condition with or without the presence of a trouble code;

wherein the processor is configured to determine the safety state of the vehicle based on point values assigned to either the at least one trouble code or the data from at least one subsystem whereby the processor infers the presence of an unsafe condition with or without the presence of a trouble code.

2. The system of claim 1, wherein the port utilizes an OBD-II or similar protocol interface.

3. The system of claim 1, wherein the processor is further configured to display on the display device a checklist of potential hazardous items for additional inspection based on the received information.

4. The system of claim 1, wherein the processor is further configured to receive information for data items related to the physical operation of the vehicle.

5. The system of claim 4, wherein the data items include at least one of brake fluid level or brake pad lining thickness.

6. The system of claim 1, wherein the processor is configured to place the electronic control unit of the vehicle in a test mode, wherein the processor receives test data relating to at least one subsystem of the vehicle from electronic control unit of the vehicle when the at least one subsystem of the vehicle is actuated by an operator during the test mode.

7. The system of claim 6, wherein at least one subsystem of the vehicle actuated by the operator during the test mode is at least one of either the steering subsystem or the brake subsystem.

8. The system of claim 1, wherein the processor is configured to determine if a network of the vehicle is operating properly based on an electrical resistance or other electrical parameter of the data bus of the vehicle.

9. The system of claim 1, wherein the processor is configured to determine if any outstanding recalls of the vehicle have not been performed based on at least one trouble code or other data retrieved from at least one subsystem of the vehicle.

10. The system of claim 1, wherein the vehicle subsystem is a body control hardware module of the vehicle.

11. The system of claim 10, wherein the trouble codes for the body control hardware module of the vehicle includes an indication of the headlights, tail lights, brake lights, or turn signals are burnt out.

12. The system of claim 10, wherein the trouble codes for the body control hardware module of the vehicle includes indication of a problem with an automatic headlight system preventing the automatic headlight system from turning on in low light conditions.

13. The system of claim 1, wherein the vehicle subsystem is an antilock braking system of the vehicle.

14. The system of claim 13, wherein the troubles codes for the antilock braking system include indication of low brake fluid, inoperative wheel sensor, or brake pad thickness.

15. The system of claim 1, wherein the vehicle subsystem is an engine control system of the vehicle.

16. The system of claim 15, wherein the troubles codes for the engine control system include indication of gas pedal failure or drive-by-wire throttle system failure.

17. The system of claim 1, wherein the vehicle subsystem is a power steering system of the vehicle.

18. The system of claim 1, wherein the vehicle subsystem is a tire pressure monitoring system of the vehicle.

19. The system of claim 1, wherein the vehicle subsystem is a safety system of the vehicle.

20. The system of claim 19, wherein the safety system of the vehicle is at least one of lane departure system, blind spot detection system, backup camera or backup sensing system, onboard radar, cameras, sensors, automatic rain sensing wiper control hardware module.

* * * * *